United States Patent

[11] 3,625,116

[72] Inventor Stephen A. Hluchan
 Riverside, Calif.
[21] Appl. No. 858,055
[22] Filed Sept. 15, 1969
[45] Patented Dec. 7, 1971
[73] Assignee Bourns, Inc.

[54] PRESSURE-SENSING DIAPHRAGM
 6 Claims, 3 Drawing Figs.
[52] U.S. Cl. ................................................ 92/104,
 73/384, 73/406
[51] Int. Cl. ...................................................... F01b 19/00,
 G01l 7/20, G01l 7/08
[50] Field of Search ............................................. 92/104;
 73/386, 384, 387, 406

[56] References Cited
 UNITED STATES PATENTS
2,841,984 7/1958 Green .......................... 73/406
3,537,308 11/1970 Darlington ................... 73/386
2,345,475 3/1944 Herman et al. ................ 92/104
2,653,552 9/1953 Gevaert ......................... 92/104
3,072,150 1/1963 Hastings et al ................ 92/104

Primary Examiner—Edgar W. Geoghegan
Assistant Examiner—A. M. Zupcic
Attorney—Fritz B. Peterson ABSTRACT: A diaphragm-type sensor comprising an integral one-piece diaphragm the central portion of which is a flat flexible disc and the outer portion of which consists of an annular peripheral rim portion and inwardly thereof an annular corrugated portion encircling the flat disc portion and consisting of a plurality of annular conical sections, the arrangement being such that displacements of the center of the diaphragm are linearly related to changes of a physical quantity which is nonlinearly related to variation of the summation of the forces acting on the face of the sensor diaphragm.

PATENTED DEC 7 1971 3,625,116

INVENTOR
STEPHEN A. HLUCHAN
BY

PRESSURE-SENSING DIAPHRAGM

BRIEF SUMMARY OF THE INVENTION

A. BACKGROUND OF THE INVENTION

It is universally the practice in indicating change of a physical quantity which in nature is or may be represented by a change in fluid pressure at a sensing point, to place at that point a pressure-sensitive transducer which in response to change of pressure converts the change into change of another physical quantity (e.g., electrical current) which is then used to effect change in an indicating device. Typical fields in which this practice exists are the indicating of altitude in an aircraft, the indicating of flow of a fluid in a conduit, and the indicating of velocity of a vehicle through air. In either instance, change of pressure with change of quantity to be indicated, such as altitude in feet, or speed in miles per hour, is sensed as by an evacuated capsule or aneroid cell, or by a Pitot tube arrangement with bellows or capsule, and the resulting translation of a portion of the sensing device is used to actuate an intermediate device, such as a potentiometer or the like, the variation of which intermediate device is utilized to cause change in an indicating device such as a meter needle.

In substantially all such fields, the variation in pressure at the sensor is nonlinear with respect to concurrent change of the physical quantity whose indication is desired. For example, in the case of an altimeter, the change in the absolute pressure exerted by the ambient atmosphere as altitude above the surface of the earth increases, is exponentially related to the altitude. Thus the primary or translational movement of the free face of an aneroid cell as altitude changes during ascent or descent of an aerial device must be modified, by such means as a nonlinear mechanical translating device such as a cam and follower or a nonlinear (function-representing) potentiometer, to provide a secondary output capable of linearly changing an indicator. An alternative, having obvious undesirable features, is to devise the indicator with a nonlinear scale which is arranged, generally with auxiliary calibration means, to bring the indication into conformity with a value of the indicated quantity as represented by the movement or translation of the sensor. Similar difficulties and complications are attached to the indication of velocity of an object through the air when Pitot means are used to sense a pressure differential which is nonlinearly related to velocity. In each of the noted classes, it has been universally attempted to so design the sensor that translational flexure or travel thereof is linear relative to the changes of pressure being sensed. Thus, in each, the various inaccuracies and departures from a norm or linear relation to sensed pressure (as in the case of instrument friction, hysteresis and other curses of instrumentation) may be additive and cause intolerably inaccurate indications, or may be mutually compensating to an unpredictable and variable degree. It is the provision of means whereby gross reduction of the noted undesirable features of prior art means may be easily attained which is a principal objective of this invention.

Another object of the invention is the provision of means for sensing applied pressure and for translating directly into linearly related indications of values of a physical quantity which are represented by respective values of sensed pressure nonlinearly related to those of the physical quantity, changes in the sensed pressure.

Other objects and advantages of the invention will hereinafter be set out or made apparent in the appended claims and the following detailed description of a preferred exemplary physical embodiment of the invention.

B. PRINCIPAL FEATURES OF THE INVENTION

As was indicated, the invention has applicability in those realms of physical measurement wherein a relationship exists between variations in the physical quantity whose value it is desired to have indicated, and a pressure which it is convenient to sense as functionally representing the physical quantity. Herein the term pressure is intended to include absolute pressure and differential pressure. The invention permits, within and by virtue of a single pressure-sensitive element, obtaining a linear relation between movement of a portion of that element as sensed pressure changes, and the values of the physical quantity or variable to be indicated. For example, as applied to an altimeter, movement of a movable portion of the pressure-sensitive element is nonlinear relative to change of ambient atmospheric pressure as altitude is increased or decreased, but is linear with respect to change of altitude. Thus movement of the moved portion of the sensitive element is a direct and linear measure of change of altitude. The same principle of using flexure or displacement of the center of a diaphragm consisting essentially of a flexible flat central portion and an integral annular encircling corrugated portion comprised of two or more conical sections and an integral peripheral flat mounting rim, is adaptable to measurement of velocity, flow, and like physical phenomena or quantities. Under the influence of applied pressure, the resilient disclike central portion of the diaphragm first assumes a concavo-convex configuration, and with further increase of pressure and further flexure of the central portion, the outer corrugated portion flexes increasingly and causes further displacement or travel of the centermost point of the flat central portion of the diaphragm. A strut or other device is secured to the latter point for transmitting the motion to indicator means. The translatory movement or travel of the center point and of the strut is nonlinear relative to change of pressure applied to the diaphragm. Rather, the movement is made to very closely follow, directly or linearly, the changes of a physical quantity or measure, such as altitude or velocity, which quantity or measure is nonlinearly related to the pressure changes sensed by the diaphragm. In altimeters, the pressure to be sensed is absolute pressure, in which case the diaphragm is sealed at its periphery to a chamber which is thereafter evacuated to a negligible value of counter pressure. Evacuation may be to a value of the order of, for example, 10 microns of Hg. In the case of flow-measurement indication, or indication of velocity, differential pressure is sensed by the sensor. In either instance, the values of change of pressure sensed versus the values of the diaphragm travel may be plotted, the nature of the graph noted, and the number and dimensions of the annular conical sections, the diameter of the diaphragm, the diameter of the flat portion, and the thickness of the diaphragm material, are selected to bring the translatory travel of the strut with respect to the change of physical quantity to be indicated into as close conformity with a linear relationship as may be required by specified accuracy tolerances. In the case of velocity-measurement indications in which the velocity versus pressure graph or curve has a much sharper knee or bend than occurs in an altitude versus atmospheric pressure curve, the ratio of the overall diameter to central flat portion diameter may be decreased. For very low pressure ranges, e.g., of the order of 0 to 1 p.s.i., the thickness of the diaphragm is selected to be much thinner than that used for, for example, an altimeter to indicate altitudes in the range from 0 to 50,000 feet in which the range of pressures involved is of the order of from 0 to 15 p.s.i.a.

The concept of the invention is described in detail with respect to a specific exemplary embodiment illustrated in the accompanying drawings relating to an altimeter, with tabulations of dimensions and values of the exemplary sensor and additional comparable tabulations relating to sensor means used in velocity meters whereby similarities and distinctions are clearly portrayed relative to different applications of the principles of the invention.

DETAILED DESCRIPTION

Figure 1:
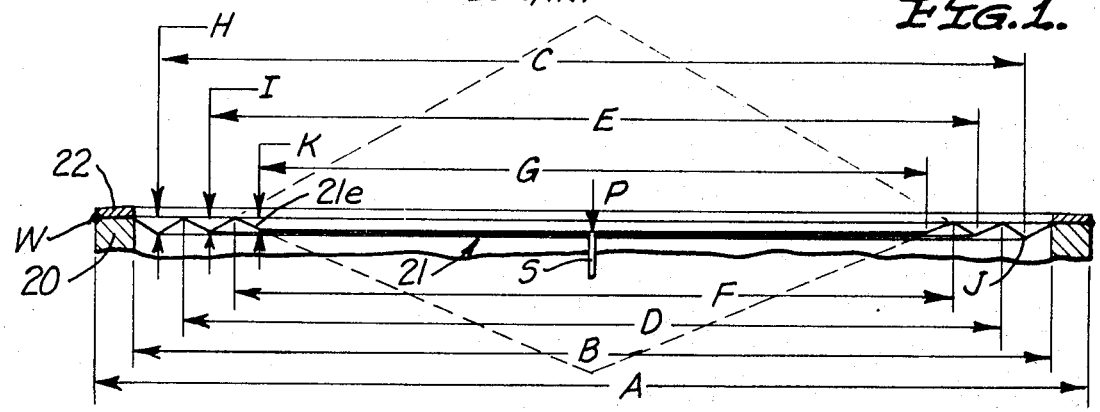
FIG. 1 is a view in cross section, to no particular scale, of an exemplary sensor according to the invention, as used in an altimeter, certain dimensional characteristics such as thickness of the diaphragm material and offsets being exaggerated in the interest of clarity of illustration.

Referring to FIG. 1, there is depicted in section a fragment of the annular upper end of a vessel 20 which is closed and sealed at its upper face by an exemplary resilient diaphragm 21 according to the invention and whose periphery is held against the vessel 20 by a ring 22 and weld W. The diaphragm is specially shaped, in accord with the principles of the invention, to comprise a flat peripheral rim 21r (FIG. 3), an annular corrugated portion contiguous to the rim, and an inner or central flat portion, all integral and formed from a single blank of resilient thin sheet material. The rim is really complementary to contiguous opposed faces of ring 22 and the peripheral face of the rim of vessel 20, and is united along its entire periphery to both the ring and the vessel by fusion therewith by a weld W produced by conventional means such as heliarc welding apparatus. Thereby a fluidtight seal or juncture is provided around the periphery and the vessel may be evacuated to a very low pressure for use in altimeters, or may be connected to one duct of a Pitot tube apparatus or the like when used in sensing differential pressure changes. The annular corrugated portion is immediately contiguous to the flat rim portion, as is indicated in FIG. 1. It extends inwardly and is constituted by a plurality of integral annular conical sections such as 21a, 21b and 21c (FIG. 3) which are alternately of oppositely directed taper and are interconnected by sharp bends of minimum practical radii, whereby in right cross section the corrugations present V-shaped configurations in a set or series of two or more V's of alternately opposite direction. In the illustrated example, there are 2½ such corrugations each of V-shaped cross section. Each full corrugation comprises two conical sections integrally joined at a juncture of minimum practical radius; and each of the corrugations is joined to and integral with the next-adjacent corrugation at a similar juncture of opposite direction. Thus the corrugated portion is composed of a set of two or more annular conical sections integral along an annular zone of juncture one of which is denoted by the letter J in FIG. 1. The conical nature of section 21e, for example, is indicated by broken lines in FIG. 1. While the angles a (FIG. 3) at which next-adjacent conical sections intersect and join is fairly shallow in the illustrated example, they may be much more acute, depending upon the sharpness of the knee of the graph (such as the altitude/pressure graph of FIG. 2), it is desired to have the sensor strut travel functionally follow as the physical variable being represented varies. The sharper or more pronounced the knee, the more acute the angle of juncture ($a$) between next-adjacent conical sections, and the shorter the reaches R of the sections. Both the angles and reaches may be varied as indicated. As the angles are made more acute, the stiffness of the individual corrugations increases, and as the reaches increase, the stiffness is moderated. By varying the number of corrugations or conical sections, and by varying the angles at which the conical sections intersect and the reaches of the sections, and the several diameters, the displacement of the sensor strut S (FIG. 1) as the pressure differential is varied may be made to follow any desired pressure/physical quantity relationship or curve, within wide ranges of values. Total range of movement of the strut may be brought into close conformity with a desired predetermined value by choice of thickness of diaphragm material, diametral dimensions, and, within limitations, choice of material of which the diaphragm is made.

In the exemplary direct-reading altimeter sensor illustrated in FIG. 1, dimensions are indicated by capital letters A, B, C, D, E, F, G, H, I and K. The values of the dimensions are indicated in the following table I. The thickness of the exemplary diaphragm, prior to formation of corrugations, was 0.005 inch; and the material was that sold under the trade name NI-SPAN C by International Nickel Corporation.

TABLE I (Altimeter Sensor)

| A | 1.755" | F | 1.264" |
|---|--------|---|--------|
| B | 1.615" | G | 1.174" |
| C | 1.534" | H | 0.025" |
| D | 1.444" | I | 0.020" |
| E | 1.354" | K | 0.010" |

The dimensions denoted H, I and K are measured from the plane of the upper surface of the annular rim. The ring 22 used with the exemplary direct-indicating altimeter diaphragm was formed from sheet stock of five mils thickness.

Dimensional data relating to an exemplary direct-indicating airspeed indicator diaphragm according to the invention and of configuration extremely similar to that depicted in FIG. 1 are tabulated in following table II. Airspeed/differential pressure and sensor (strut) travel/differential pressure values are listed in table III whereby a graphical representation similar to that of FIG. 2 relating to the altimeter may be drawn. The graphs are in the interest of brevity of disclosure not included in the drawings, but can readily be drawn on rectangular (square) coordinates paper using the tabulated data. The strut travel/airspeed graph is a straight line through the range of interest (from about 50 knots to 225 knots), and the strut travel/differential pressure graph is comparable to the altitude/pressure graph of FIG. 2 but has a flatter configuration at lower values in the range and has a more pronounced (sharper) knee. The exemplary airspeed indicator diaphragm was made of the specific material previously mentioned, and was of 0.0018 inch thickness.

TABLE II

| A | 1.755" | F | 1.224" |
|---|--------|---|--------|
| B | 1.624" | G | 1.124" |
| C | 1.524" | H | 0.025" |
| D | 1.424" | I | 0.020" |
| E | 1.324" | K | 0.010" |

TABLE III

| Air Speed (Knots) | Differential Pressure (Inches Mercury) | Sensor Strut Travel (Inch) |
|---|---|---|
| 0 | 0.00 | 0.0000 |
| 72 | 0.25 | 0.0027 |
| 103 | 0.50 | 0.0060 |
| 125 | 0.75 | 0.0084 |
| 144 | 1.00 | 0.0113 |
| 160 | 1.25 | 0.0147 |
| 175 | 1.50 | 0.0173 |
| 190 | 1.75 | 0.0210 |
| 202 | 2.00 | 0.0237 |
| 214 | 2.25 | 0.0265 |
| 225 | 2.50 | 0.0301 |

It is evident from the tabulated values that the several parameters including thickness of diaphragm material, central flat portion diameter, diameters and depths of the corrugations as represented by lengths and major and minor diameters of the conical sections, and the number of the conical sections, may be varied to cause the deflection or travel of the strut to conform very closely to that required to exactly match variation of a physical quantity, such as altitude, which quantity it is desired to indicate in linear relationship to strut travel, irrespective of the fact that the physical quantity varies nonlinearly with variation of pressure-differential sensed by the diaphragm, all within practical limits. The stiffness of the conical sections is increased by increasing the acuteness of the angle between next-adjacent integral sections. Total pressure range to be accommodated is anticipated by selection of thickness of material of which the diaphragm is formed. For example, note the pressure range for an exemplary altimeter is 0–15 p.s.i., as in the previously detailed example, and a diaphragm thickness of 0.005 inch may be used; also note the thickness (0.0018 inch) of the material in the exemplary velocity or airspeed indicator the important characteristics of which have been noted or included in tables II and III, and which was applied for use over a differential pressure range from 0 to 2½ inches of mercury column. It may be noted that, for a specified pressure range, the outside diameter may depend somewhat upon the specified range of travel of the strut in case the latter is restricted. In general to accommodate steep or higher rate variations of sensor travel per unit change of pressure corresponding to variations of pressure at and near the lower end of the pressure range, yielding of the less stiff central flat portion of the diaphragm is relied upon, and as the rate of variation of sensor strut travel per unit change of pressure decreases as the sensed pressure increases, yielding occurs to an increasing extent in the conical sections of the annular corrugated portions. As is evident, the shallower the corrugation the nearer the formation approaches that of a flat disc; and the deeper the corrugation the stiffer the resistance to deformation and hence the less yielding per unit increase of applied pressure. For example, referring to FIG. 2, the greatest rate of change of the indicated physical quantity (altitude) with change of sensed pressure occurs at the low-pressure end of the range. Thus it is within the high-altitude (low pressure) range of from about 42,000 feet altitude (2.5 p.s.i.) to about 27,000 feet altitude (5.0 p.s.i.) that gross deflection of the central portion of the diaphragm and strut occurs, with concurrent large change of indications of the physical variable and relatively small increases of unit pressure sensed. As the rate of change of indicated altitude and of strut travel per incremental unit change of pressure thereafter progressively decreases as sensed pressure increases, the further flexing of the central portion decreases and flexure of the stiffer annular corrugated portion increases.

Thus, it is evident that the number and reach of the conical sections and the acuteness of the interior angles between next-adjacent conical sections may be varied so as to very closely match any required functional relationship between variations of sensed pressure and strut travel to produce linear or scalar indication of the significant physical variable of interest. The relationship between the change of sensed pressure and the physical quantity to be indicated may be any of several, as in the cases of altimeters, airspeed (velocity) indicators, and flowmeters, and since ranges of sensed pressure may vary widely and be, for examples, from 0–1 p.s.i.d. for one type of speed indicator, 0–15 p.s.i.a. for one type of altimeter, and 10–500 p.s.i.d. for a type of flowmeter, and since the environmental conditions under which the sensor may be specified to operate vary widely as to temperature, vibration, etc., and since maximum instrument dimensions and maximum strut travel may be dictated by others than the manufacturer of the sensor, no specific general formula applicable to all possible applications of the invention is possible of derivation. Hence application of the principles of the invention is empirical, the number and steepness of the annular conical sections, the relative areal extents of the flat central portion and of the encircling conical sections, the outer (maximum) diameter of the diaphragm, and the thickness of the diaphragm, must be selected in conformity with the particular specifications to be met. In all instances, use of an outer rim portion whereby the diaphragm may be anchored and sealed at its periphery, an annular corrugated portion comprising two or more conical sections joining the rim, and a flexible flat circular center portion encircled by the corrugated portion, all of the three portions integral and of resilient sheet material, permit linear change of indication of a physical variable relative to diaphragm deflection or travel which is nonlinearly related to changes of pressure which are sensed by the diaphragm.

Figure 2:
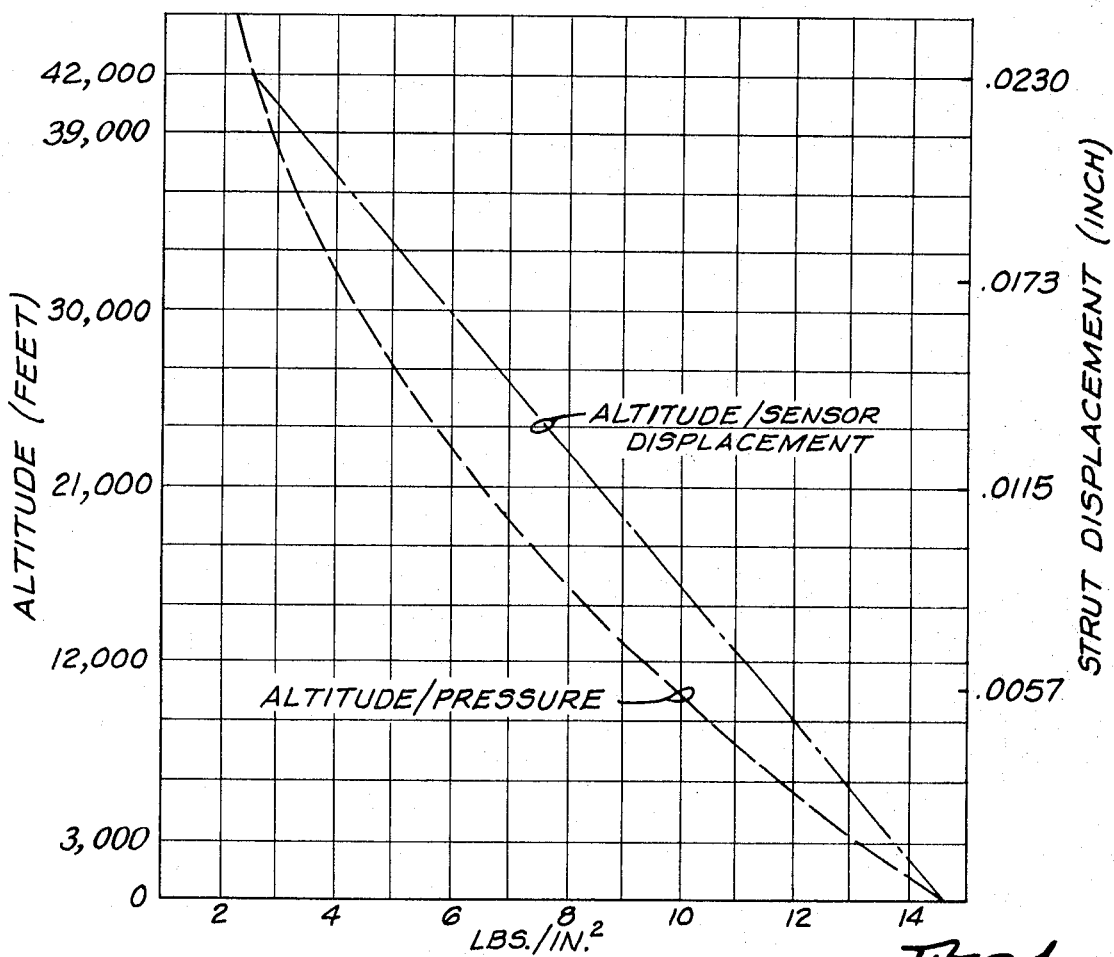
FIG. 2 is a graphical representation illustrating movement, i.e., displacement, of the sensor strut of the sensor depicted in FIG. 1, relative to change of altitude and to change of absolute atmospheric pressure.
Figure 3:
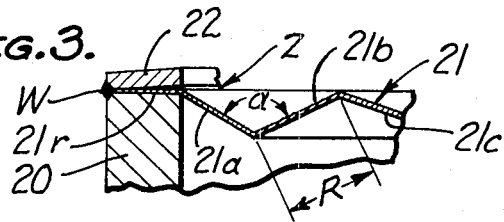
FIG. 3 is an enlarged fragmentary sectional view illustrating details of the fusion-united members at the peripheral junction of the diaphragm of FIG. 1 with a cap ring and an evacuated vessel, and details of next-adjacent conical sections of the diaphragm.

In the sensor constructions utilizing the annular conical sections encircling the flat central portion, the entire areal extent of the diaphragm that is subjected to pressure, whether absolute or differential, is disposed as indicated in FIGS. 2 and 3 so the net force is in the direction indicated by the arrow at P, whether the motion-transmitting strut S is mounted on the lower face as shown or on the upper face. The exemplary flat peripheral rim 21r is disposed between the cap ring 22 and the annular face of the supporting device 20. The outermost portion of the flat rim is fusion united with both the ring 22 and the device 20 by the weld W. Action of the weld or fusion, and cooling of the weld and contiguous material causes a slight radial tensioning of the diaphragm and a slight tilting of the cap ring 22 as indicated in FIG. 3. The tilting, which is shown exaggerated in the drawing so as to more clearly illustrate the feature, provides a very small gap Z and permits the very slight creeping of the rim of the diaphragm that occurs during cooling of the weld. The resultant radial tensioning of the diaphragm eliminates otherwise possible oilcan effect in the diaphragm. In other respects, manufacture and assembly of the diaphragm and sensor may be conventional, including shaping the diaphragm by die means.

As is evident, the invention obviates necessity for means intermediate the diaphragm and a linear indicator for translating strut excursion or travel incident to pressure change into accurate representations of the change of the indicated physical variable which are in turn nonlinearly related to changes of sensed pressure.

I claim:

1. A pressure-sensing resilient diaphragm for direct linear indication of variation of a physical quantity nonlinearly related to a change of a pressure, said diaphragm effective to flex and cause direct indication by translational travel of a center point thereof incident to sensing of changing pressure thereon and to cause such travel to be nonlinear relative to changes of the sensed pressure and to cause such travel to be substantially linear relative to values of a variable physical quantity whose values are nonlinearly related to such changes of sensed pressure, said diaphragm being a unitary integral combination of a very small central portion disposed for attachment of a motion-transmitting strut, a flexible substantially flat free-to-flex circular portion encircling said area, and an annular corrugated portion consisting of a set of annular conical sections encircling said flat free-to-flex portion, and said set of conical sections including two conical sections of oppositely directed taper and of V-shaped cross section and joined along a juncture of minimum practical radius, and an outer rim portion encircling said annular corrugated portion providing means for attachment of the diaphragm to a supporting device.

2. A pressure-sensing resilient diaphragm for direct linear indication of a physical quantity nonlinearly related to change of a pressure, said diaphragm effective to flex and cause direct indication by translational travel of a center point thereof incident to sensing of changing pressure thereon and to cause such travel to be nonlinear relative to the changes of the sensed pressure and to cause such travel to be substantially linear relative to values of a variable physical quantity whose values are nonlinearly related to such changes of sensed pressure, said diaphragm being a unitary integral combination of a flexible substantially flat circular central portion, an annular portion consisting of annular conical sections encircling said central portion and said conical sections including two conical sections of oppositely directed taper, and an outer rim portion encircling said annular corrugated portion and providing means for attachment of the diaphragm to a supporting device, said annular conical sections being of differing reach.

3. A diaphragm as defined in claim 1, in which said annular conical sections define at least two corrugations, and in which the included angle between next-adjacent conical sections forming a corrugation is greater in the innermost corrugation than that between the conical sections forming the outermost corrugation, whereby that portion of the diaphragm formed by the outermost corrugation is stiffer than that portion formed by the innermost corrugation.

4. A diaphragm as defined in claim 1, in which said annular corrugated portion comprises five conical sections each joining another thereof at a circular line of juncture along which line of juncture the diaphragm is deformed to a very small radius of dimension of the order of several times the thickness of the diaphragm in said central portion.

5. A diaphragm according to claim 1, said diaphragm having secured thereto at the periphery of said rim portion a supporting means providing a rigid support maintaining said rim portion substantially in a single plane.

6. A diaphragm according to claim 5, in which said supporting means comprises a planar annular face area of a vessel which area is complementary to said rim portion at one face of the diaphragm, and an annular ring disposed at the other face of the diaphragm and complementary to said rim portion, the adjacent contacting peripheries of said ring and diaphragm being fusion-united with said supporting means along said peripheries, whereby said diaphragm is radially tensioned.

* * * * *